United States Patent [11] 3,579,903

| [72] | Inventor | Johnny E. Stewart<br>P.O. Box 7765, Waco, Tex. 76710 |
| --- | --- | --- |
| [21] | Appl. No. | 758,329 |
| [22] | Filed | Sept. 9, 1968 |
| [45] | Patented | May 25, 1971 |

[54] ANIMAL CALL
9 Claims, 3 Drawing Figs.

[52] U.S. Cl. .......................................................... 46/180
[51] Int. Cl. ......................................................... A63h 5/00
[50] Field of Search ............................................ 46/180,
181, 179; 84/330, 380, 381, 384, 398, 399, 383

[56] References Cited
UNITED STATES PATENTS
3,020,675   2/1962   Boecker ...................... 46/180

*Primary Examiner*—Louis G. Mancene
*Assistant Examiner*—Robert F. Cutting
*Attorney*—Baldwin, Wight, and Brown ABSTRACT: This disclosure relates to an animal call of the type adapted to simulate the sounds of game birds and other wild life, and includes a tubular body through which air is blown to vibrate a reed for generating sound waves and a depressible plunger for contacting the reed to vary the pitch as desired, the plunger being constructed of relatively soft resilient material and being disposed immediately adjacent a mouthpiece end of the tubular body whereupon the plunger can be depressed by a user's mouth, lips or teeth thus leaving his hands free to manipulate a gun, camera or other instrument.

PATENTED MAY 25 1971

3,579,903

INVENTOR.
JOHNNY E. STEWART

BY
Baldwin Wight Diller & Brown
ATTORNEYS

ANIMAL CALL

A primary object of this invention is to provide a novel animal call which includes a generally tubular body defining a passage through which air is adapted to be blown from a mouthpiece end portion of the body toward an opposite end thereof, reed means in the passage for generating sound waves in response to the movement of air through the passage, and means for varying the pitch of the sound waves to selectively simulate a variety of wild life sounds, the pitch varying means including a plunger projecting from the exterior of the body therethrough into the passage for contacting the reed means upon the depression of the plunger, and the plunger having a soft resilient exterior end portion positioned immediately adjacent a terminal end of the mouthpiece end portion whereby the plunger can be depressed by a user's mouth, lips or teeth.

A further object of this invention is to provide a novel animal call of the type heretofore described wherein the plunger is of a one-piece homogeneous polymeric construction, and the exposed plunger end is an enlarged head which normally biases the plunger to a position remote from the reed means.

Still another object of this invention is to provide a novel animal call of the type heretofore described wherein means are provided for limiting the movement of the plunger toward and away from the generating means, the limiting means being defined on one hand by the exposed end portion of the plunger and on another hand by an integral homogeneous enlarged portion of the plunger disposed interiorly of the tubular body.

Still another object of this invention is to provide a novel animal call of the type heretofore set forth wherein the plunger is of a generally mushroom-shaped configuration in axial cross section, and the exposed end portion of the plunger includes a peripheral skirt having an edge in contact with an exterior surface of the tubular body for normally biasingly urging the plunger to the position thereof remote from the reed means.

With the above and other objects in view that will hereinafter appear, the nature of the invention will be more clearly understood by reference to the following detailed description, the appended claimed subject matter, and the several views illustrated in the accompanying drawing.

Figure 1:
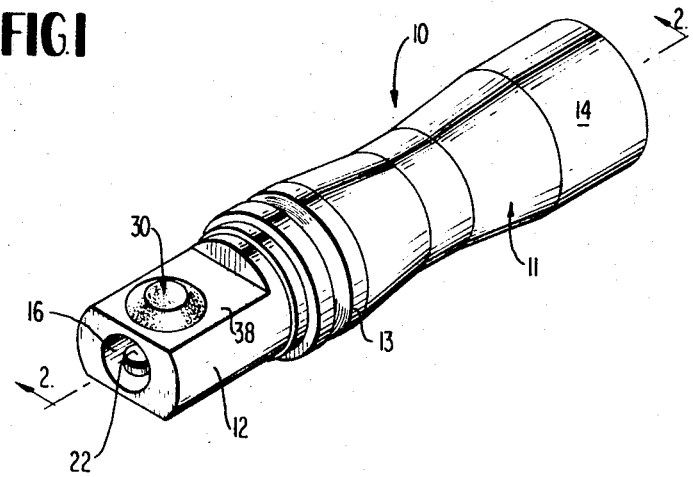
FIG. 1 is a top perspective view of the novel animal call of this invention, and illustrates an exteriorly exposed resilient head of a plunger positioned immediately adjacent a terminal end of a mouthpiece portion of the call.
Figure 2:
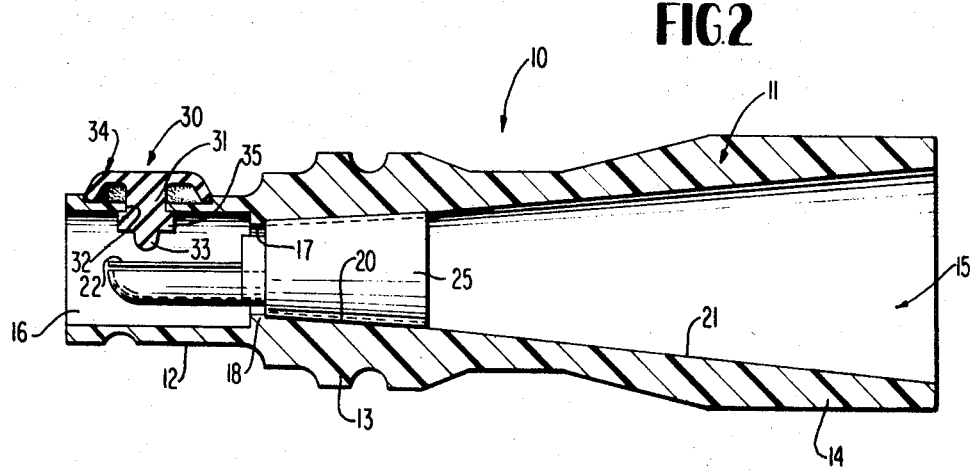
FIG. 2 is an enlarged axial sectional view taken generally along line 2–2 of FIG. 1, and more clearly illustrates the components of the animal call and an interior end of the plunger spaced remotely from the reed in a nondepressed position thereof.

A novel animal call constructed in accordance with this invention is fully illustrated in the drawing, and is generally designated by the reference numeral 10. The animal call 10 includes a generally tubular body 11 having an inner mouth piece end portion 12, an intermediate portion 13, and an opposite outer end portion 14. As is best illustrated in FIG 2, the tubular body 11 defines a passage 15 through which air is adapted to be blown during which time the air moves through the passage 15 from left to right as viewed in FIG. 2. The passage 15 is defined by a cylindrical bore portion 16, a slightly smaller bore portion 17 which defines a radially inwardly directed peripheral shoulder 18, a frustoconical bore portion 20 and another and longer frustoconical bore portion 21. The tubular body 11 is preferably though not necessarily constructed from a single piece of relatively rigid synthetic polymeric or copolymeric plastic material.

Conventional means are provided for generating sound waves which simulate the sounds of wild game, birds, and other animals. The generating means include a metallic reed 22 normally spaced from and generally parallel to an upper edge (unnumbered) of a body 23 which is of a generally hollow semicylindrical configuration having a closed end 24. The reed 22 and the body 23 are carried by a hollow plug 25 which is securely held in the position shown in FIG. 2 by the frictional purchase between its exterior surface (unnumbered) and the bore portion 20. The plug 25 is inserted into the tubular body 11 from right-to-left and the shoulder 18 thereby functions to accurately locate the body 23 and the reed 22 in the bore portion 16 of the mouthpiece end portion 12. Thus, when a user blows air from left-to-right through the passage 15 the vibrating reed 22 generates sound waves which are desirably varied in pitch by means 30 which will be described immediately hereafter.

The pitch varying means 30 is a plunger which includes a stem 31 slidably received in a radial bore 32 of the mouthpiece end portion 12. The stem 31 has an internal terminal end 33 which is normally spaced remotely from the reed 22, as shown in FIG. 2, but upon the depression of the plunger 30 the terminal end 33 can contact the reed 22 with varying pressure to produce variations in pitch. The plunger 30 is in keeping with the major novel feature of this invention constructed from relatively soft and resilient plastic material, and is positioned immediately adjacent the terminal edge (unnumbered) of the mouthpiece end portion 12 such that an enlarged head 34 of the plunger 30 can be depressed by the user's lips or teeth, leaving his hands free for manipulating a camera, gun or other instrument. The soft and pliable though resilient nature of the plunger 30 and particularly the head 34 thereof also prevents any damage from occurring to the user's mouth when the plunger 30 is orally manipulated.

As was heretofore noted, the plunger 30 is of a single piece homogeneous plastic construction and in order to be positioned as shown in FIG. 2, a radially outwardly directed peripheral shoulder 35 is temporarily deformed when the stem 31 is passed through the radial bore 32. However, upon passing beyond the bore 32 and entering the interior of the bore portion 16, the shoulder 35 rebounds to its normal configuration which is that shown in FIGS. 2 and 3, and functions as the means for preventing the inadvertent or accidental withdrawal of the plunger 30 in an outward direction.

Figure 3:
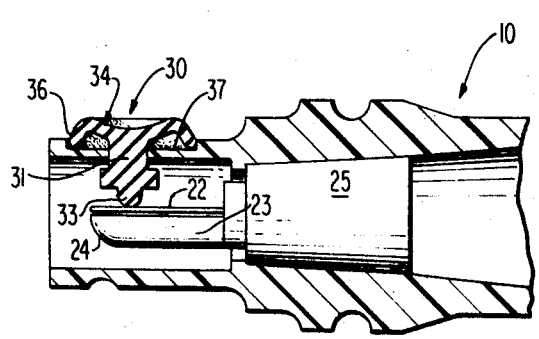
FIG. 3 is a fragmentary sectional view similar to FIG. 2, and illustrates the plunger in its depressed condition thereby contacting the reed for altering the pitch of emitted sound waves.

The head 34 likewise limits the inward movement of the plunger 30 in a manner readily apparent from FIG. 3. Furthermore, the head 34 includes a peripheral skirt 36 which is received in a circular recess 37 formed in an upper flattened portion 38 of the mouthpiece end portion 12. In this manner the plunger 30 not only functions to vary the pitch of the sound emanating from the call 10, but the head 34 thereof and particularly the resilient nature of the peripheral skirt 36 function as means to continually bias the plunger 30 from the position shown in FIG. 3 to the position shown in FIG. 2.

From the foregoing it is believed readily apparent that the particular construction and disposition of the plunger 30 relative to the mouthpiece end portion 12 permits the call 10 to be used in a highly efficient manner by oral pressure upon the plunger 30 and without fear of damaging one's teeth or lips because of the relatively soft construction of the plunger head 34. The one-piece construction of the plunger 30 is also highly desirable from a manufacturing standpoint since it can be economically produced and not only functions to vary the pitch of the emitted sounds, but the enlarged shoulder 35 and the head 34 prevent the accidental removal of the plunger from the bore 32 and, of course, the resilient nature of the head 34 also functions as integral biasing means normally urging the plunger to the position shown in FIG. 2. Thus, the single piece construction of the plunger 30 eliminates the necessity of such conventional devices as return springs, stop pins, etc.

While preferred forms and arrangements of parts have been shown in illustrating the invention, it is to be clearly understood that various changes in details and arrangement of parts may be made without departing from the spirit and scope of this disclosure.

I claim:

1. An animal call comprising a generally tubular body defining a passage through which air is blown from an inner mouthpiece end portion of said body toward an opposite outer end portion thereof, means in said passage for generating sound waves in response to the movement of air through said passage, and means for varying the pitch of the sound waves generated by said generating means, said pitch varying means including a plunger projecting from the exterior of said body therethrough into said passage at said inner mouthpiece end portion for contacting said generating means upon the depression of said plunger, and said plunger having an exteriorly exposed end positioned immediately adjacent a terminal end of said mouthpiece inner end portion whereby said plunger can be depressed by a user's mouth, lips or teeth.

2. The animal call as defined in claim 1 wherein said plunger is of a one-piece homogeneous polymeric construction, and said plunger end is an enlarged head.

3. The animal call as defined in claim 1 wherein means are provided for normally biasing said plunger to a position remote from said generating means, and said biasing means is an integral homogeneous portion of said plunger.

4. The animal call as defined in claim 1 wherein an end of said plunger disposed exteriorly of said tubular body is constructed from relatively soft material to prevent damage to a user's mouth upon the oral depression of said plunger.

5. The animal call as defined in claim 1 wherein means are provided for limiting the movement of said plunger toward and away from said generating means, and said limiting means are integral homogeneous portions of said plunger disposed both exteriorly and interiorly of said tubular body.

6. The animal call as defined in claim 1 wherein said plunger is defined by an exterior head constructed from resilient material, and said head includes a peripheral edge in contact with said tubular body for normally biasingly urging said plunger to a position remote from said generating means.

7. The animal call as defined in claim 6 wherein said plunger is of a generally mushroom-shaped configuration in axial cross section.

8. The animal call as defined in claim 6 wherein means are provided for limiting the movement of said plunger toward and away from said generating means, and said limiting means are integral homogeneous portions of said plunger disposed both exteriorly and interiorly of said tubular body.

9. The animal call as defined in claim 7 wherein means are provided for limiting the movement of said plunger toward and away from said generating means, and said limiting means are integral homogeneous portions of said plunger disposed both exteriorly and interiorly of said tubular body.